United States Patent [19]
Castenmiller

[11] Patent Number: 6,058,281
[45] Date of Patent: May 2, 2000

[54] SCAN MODULE FOR A DOCUMENT COPYING MACHINE

[75] Inventor: Thomas J. M. Castenmiller, Eindhoven, Netherlands

[73] Assignee: Oce - Technologies B.V., Ma-Venlo, Netherlands

[21] Appl. No.: 08/950,592

[22] Filed: Oct. 15, 1997

[30] Foreign Application Priority Data

Oct. 15, 1996 [NL] Netherlands ............................ 1004280

[51] Int. Cl.[7] .................................................. G03G 15/00
[52] U.S. Cl. ........................... 399/118; 399/362; 399/377
[58] Field of Search ................................ 355/25; 399/118, 399/362, 377, 379, 380, 177; 358/474, 497, 300

[56] References Cited

U.S. PATENT DOCUMENTS

| | | |
|---|---|---|
| 4,647,178 | 3/1987 | Sasaki et al. ............................ 399/118 |
| 4,666,287 | 5/1987 | Malyon . |
| 4,799,080 | 1/1989 | Fujiwara .................................. 399/185 |
| 5,267,530 | 12/1993 | Siegel . |
| 5,379,095 | 1/1995 | Oishi . |
| 5,390,033 | 2/1995 | Bannai et al. ........................... 358/498 |
| 5,457,547 | 10/1995 | Yamada . |
| 5,677,776 | 10/1997 | Matsuda et al. ........................ 358/475 |
| 5,798,841 | 8/1998 | Takahashi ................................ 358/296 |

FOREIGN PATENT DOCUMENTS

| | | |
|---|---|---|
| 62-099770 | 5/1987 | Japan . |
| 7-140561 | 6/1995 | Japan . |
| 1586112 | 5/1977 | United Kingdom . |

*Primary Examiner*—Robert Beatty
*Attorney, Agent, or Firm*—Birch, Stewart, Kolasch & Birch, LLP

[57] ABSTRACT

A scan module for a document copying machine which is provided with its own document scanner. The scan module is provided with a housing suitable for releasable fixing to the document copying machine, the housing being provided with a light exit opening optically coupled to the document scanner of the document copier machine via the image platen. The scan module is also provided with a light source and reflector.

28 Claims, 7 Drawing Sheets

SCAN MODULE FOR A DOCUMENT COPYING MACHINE

FIELD OF THE INVENTION

The invention relates to a scan module suitable for adding to a document copying machine having its own document scanner means, and to a system comprising a scan module of this type and a document copying machine.

DESCRIPTION OF THE BACKGROUND ART

A conventional document copying machine is provided with document scanner means for scanning an original sheet placed on a window. In conventional electrophotographic apparatus, the original sheet is exposed by suitable lighting, the reflected light being projected on to a photoconductive belt or drum to form a charge image thereon. A toner image then formed thereon is then transferred to and fixed on a copy sheet. Scanning can be achieved either by means of a moving original sheet, by movement of the window, or by scanning the original sheet by means of an opto-mechanical system with movable reflectors.

In digital document copying machines, photoelectric converters such as CCDs also form part of the document scanner means. In this case the reflected light of an original sheet is projected strip-wise on a row of photoelectric elements. These then generate image signals which are an indication of the quantity of light incident thereon. Such image signals can then be used to expose a photoelectric medium by laser scanning or LED exposure.

U.S. Pat. No. 4,666,287 describes a first embodiment of document scanner means wherein an original can be placed on a window with a transparent part between which the original sheet can be placed with the information page face upwards. The original is fixed on the window by a clip. This window and clip assembly is movable over a transparent window of an analogue document copying machine. In this case the term "analogue" denotes a direct exposure of a photoconductor by the reflected light. The advantage of a movable window is its simplicity. A disadvantage, however, is the need to keep the original sheet properly in position during the movement of the window. Particularly in the case of bound documents, the clip required for this purpose may involve the risk of damaging the document. The patent then proposes to replace these relatively simple scanner means with a movable window in such cases, by more complex scanner means with an immovable window. For this purpose, in a second embodiment, the entire assembly of the movable window and clip of the document copying machine is removed and replaced by scanner means having an immovable window. By moving a linear reflector over the original sheet in combination with a second reflector moving in the opposite direction, a projection of the original sheet through the transparent window is obtained on the photoconductor of the document copying machine via a lens system.

Since the original sheet no longer has to be moved, it consequently no longer needs to be clipped so firmly. This reduces the risk of damage to a bound document.

Another problem is that in scanner means in which a bound document is placed with the information page face up, the document always has to be turned over to be able to turn to the next page of the document. This is a complicated procedure. In addition with bound documents there is the distortion which occurs when a thick document is placed opened on a flat window. Defocusing and distortion occur in the image formation. There is also a loss of light and reflection due to incomplete contact between a flat window and flat clip.

The U.S. Pat. No. 4,666,287 describes a third embodiment of scanner means in which a bound document is held against a V-shaped window with the information page face up and partially opened. A reflector is then moved parallel to one of the two sides of the V-shaped window. Since a bound document now no longer has to be opened into one plane, there is less risk of distortion of the bound document. The disadvantage, however, is that the construction now becomes complex, having two sides of a window at an angle, and hence expensive, while the document copying machine is now unsuitable or much less suitable for copying loose original sheets since the original scanner means have been removed.

Precautions also have to be taken to enable the original scanner means to be readily removed. This in turn involves extra steps and limitations in the construction of the original scanner means. This means that with existing document copying machines, it is not possible to mount the above-described alternative document scanner means. Replacement is even impossible particularly in the case of scanner means integrated in a document copying machine in the housing beneath the window. Making adjustments to document copying machines involves extra unnecessary expense for those users who do not require extra facilities for copying bound documents. More often than not, it is a restricted small group of specific users, such as libraries, who have a specific requirement for facilities for copying books. This, however, results in a general increase in price if the document copying machines are made suitable for all users in order to replace the existing document scanner means by alternative scanner means. A limited series of adapted document copying machines also involves extra costs in terms of manufacturing, because of the small scale of production involved. In addition, there are logistical and servicing disadvantages in marketing two different constructions of document copying machines, one of which is suitable for replacement with extra document scanner means and the other unsuitable for this purpose.

SUMMARY OF THE INVENTION

The scan module according to the present invention does not have these disadvantages or else has them to a reduced degree. This scan module is for a document copying machine having a document scanner means. The scan module of the present invention comprises a housing releasably fixing the scan module to the document copying machine, a light exit opening in the housing optically coupled to the document scanner means of the document copying machine, a light source for exposing a document to be fed to the scan module, and reflector means for deflecting light reflected by a document to the light exit opening via an optical path.

These and other objects of the present invention are also fulfilled by a system comprising a document copying machine having document scanner means and a scan module. The scan module comprising a housing releasably fixing the scan module to the document copying machine and a light exit opening in the housing optically coupled to the document scanner means of the document copying machine. The scan module further comprises a light source for exposing a document to be fed to the scan module and reflector means for deflecting light reflected by a document to the light exit opening via an optical path.

Instead of replacing the document copying machine's own document scanner means by a scan module, as is the case in the cited prior art, a scan module is added to the existing document scanner means in order to co-operate therewith. The advantage of this is that no or at most only minimal intervention is required at the document copying machine and the document scanner means do not have to be removed therefrom. The only coupling required is at most a coupling of an optical light path of the scan module to the optical light path of the document scanner means. This means that the document scanner means of the document copying machine have to scan the light exit opening of the scan module.

One embodiment of the scan module is characterized in that lens means are included in the optical path, the image plane of the lens means being situated at the location of a document application plane of the document copying machine. The adjustment of the object plane of the scanner means of the document copying machine does not then have to be changed since it is already adjusted to the document application plane. Also, the document copying machine remains suitable for scanning original sheets by its own scanner means.

Another advantageous embodiment of a scan module is obtained if the optical magnification factor formed by the lens means is equal or substantially equal to unity. The magnification factor set by the document copying machine for its scanner means does not then have to be changed.

Despite the fact that the image projected by the scan module is focused on the document copying machine document application plane, there may be differences in the aperture angles of the two optical systems depending upon the properties and limitations thereof. Unless special steps are taken, part of the light originating from the scan module may not reach the document scanner means of the document copying machine due to differences in the aperture angles. Another advantageous embodiment, therefore, is obtained if light deflection means are included in the optical path at the location of the light exit opening for the purpose of deflecting to a light entry opening of the document scanner means of the document copying machine the light emerging from the light exit opening. In the case of focusing near the light exit opening, which normally practically coincides with the document application plane of the document copying machine, these means will have no influence on the image formation but they will affect the efficiency of the light coupling.

In one advantageous embodiment, the scan module comprises a document drawer which is slidable into a first and a second position for the purpose of receiving or turning a document with the information page face up in the first position, and for positioning the document drawer, in the second position, in a position in which the document situated therein with the information page face up is scanned by the scanner means of the scan module. There is no need for the document itself to be turned over for the purpose of turning over a page.

A particularly advantageous embodiment is obtained in this connection with light deflecting means which comprise a diffuser and which are also direction-sensitive. In the first place, a diffuser is cheaper than collimating lenses. By scattering incident light in all directions, as in the case of a non-direction-sensitive diffuser, a greater light flow is already received by the document scanner means of the document copying machine. With scatter in precisely the direction of the document scanner means this is optimized still further.

In the case of a document copying machine with its own document scanner means, in which at least a part of the document scanner means is movable with respect to a document for scanning thereby, an advantageous system is obtained in combination with a scan module according to the invention in that in a first mode in which the scan module is not mounted the at least one part of the document scanner means move with respect to a document present on the document copying machine and in a second mode in which the scan module is mounted and is operative the at least one part of the document scanner means is situated in a fixed position with respect to the light exit opening of the scan module.

In this case, only the control system of the document copying machine has to be adapted in order to move the part of the document scanner means into the fixed position in the second mode. In this case no further mechanical adjustments of the document copying machine are necessary.

In a document copying machine with its own document scanner means wherein the document copying machine is provided with means for automatically supplying documents in order to move the documents along the document scanner means disposed in a fixed position, an advantageous system is obtained in combination with a scan module according to the invention in that the light exit opening of the scan module is situated opposite the fixed position. In this case, it is even superfluous to provide extra control of the document scanner means in respect of the position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
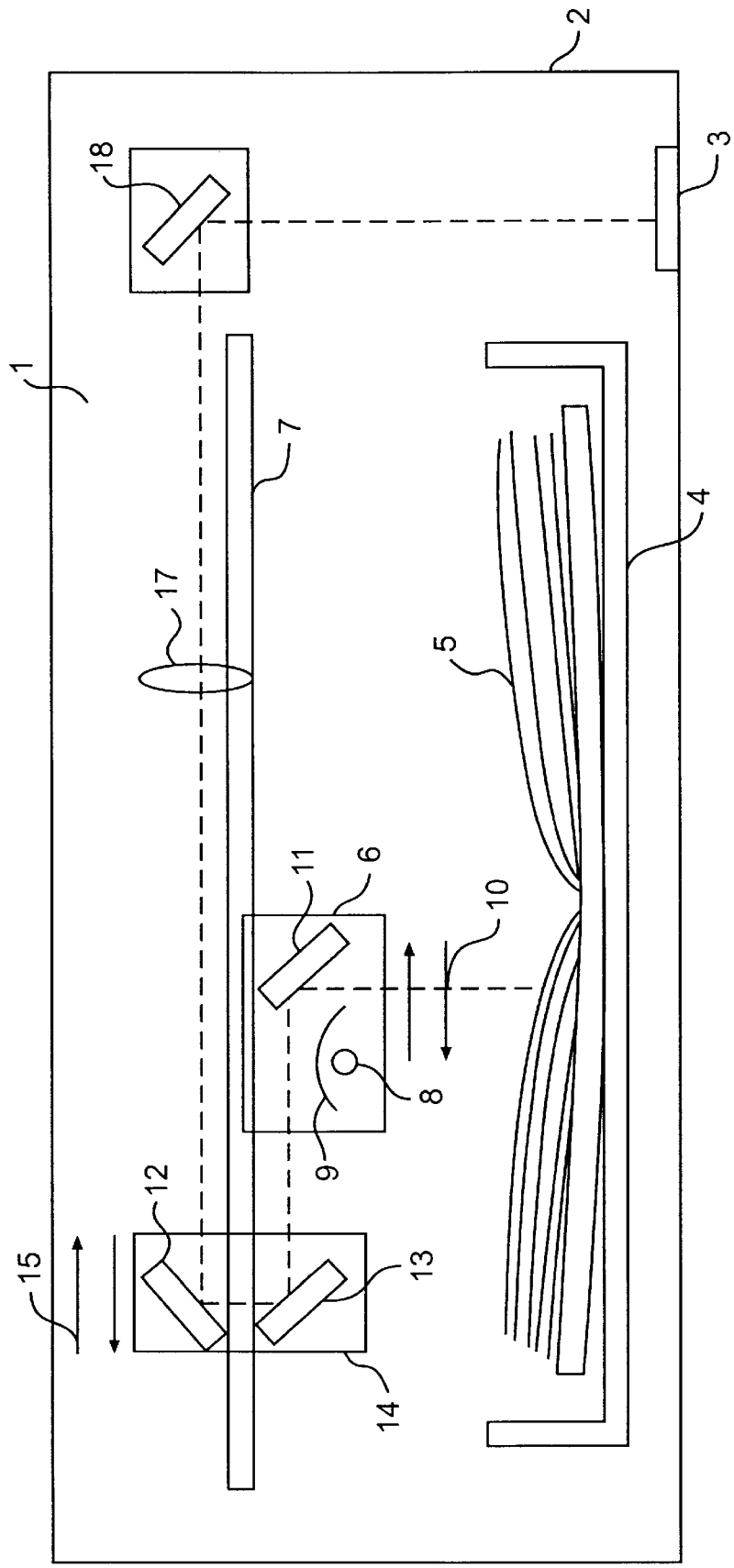
FIG. 1 shows a scan module according to the invention.

FIG. 1 illustrates a scan module 1 according to the invention. The scan module is physically bounded by a housing 2 and forms an independently functioning unit. The control means and drive means required for this purpose are not shown in the drawing since they are readily implemented by the skilled artisan. Any signal connections taken out for synchronization with co-operating apparatus are also omitted for the same reason. Mechanical means for releasably connecting the scan module to document scanner means of a document copying machine are also steps for which the skilled artisan requires nothing more than his or her normal knowledge. What is an essential step for the invention is a light exit opening 3, through which visible light emerges from the housing 2. In the simplest construction, the light exit opening 3 can be formed by an opening in the form of a slot closed by optically transparent material, e.g. a glass plate. In more specific constructions, the optical material may have special refractive properties as will be illustrated hereinafter.

In the scan module 1 according to the invention, a bound document, e.g. a book, is scanned with the information page extending upwards (face-up). This has the advantage that the document does not need to be turned over before turning to a following page. This is in contrast to conventional document copying machines in which an original must be placed face down. For this purpose the scan module 1 comprises a document drawer 4 which can be slid out so that in the slid-out position the document drawer 4 projects from the housing 2. In the slid-out position, a sheet of a bound document 5 with the information page face up can be turned over. In the slid-in position the document drawer 4 is situated beneath the scanner means of the scan module 1 and a bound document 5 situated in the document drawer can be scanned.

The scanner means comprise a scan carriage 6 movable along a guide mechanism 7 in the directions indicated by the arrows 10. The scanner carriage 6 comprises a lamp 8 for exposing the document 5, a shielding cap 9 and a specular reflector 11. These are all of linear construction with the longitudinal axis perpendicular to the directions of movement 10 so that a strip of the document 5 is scanned perpendicularly to the directions of movement 10 for each position of the scan carriage 6. In these conditions, the scan carriage 6 moves over the entire document 5. The light originating from the lamp 8 and reflected by the document 5 is deflected by the reflector 11 to the inverting mirrors 12 and 13 in a mirror carriage 14, which is also movable. The mirror carriage 14 is movable in the same directions 15 as the scan carriage 6, although at half the speed. As a result, the length of the optical path 16 remains the same. The light originating from the mirror carriage 14 is deflected to the light exit opening 3 via fixed focusing lens means 17 and a fixed reflector 18. It should be noted that although the scan module 1 described here is constructed with a movable scan carriage 6 and a stationary document 5, it is equally possible to pass the document 5 beneath a stationary scan carriage 6. What is important, however, is that linear scanning is obtained, the instantaneously scanned strip always emerging through the light exit opening 3. Preferably, the light exit opening 3 faces downwards for the purpose of optical coupling with document scanner means of a document copying machine in which the originals for scanning are scanned with the information page face down. The scan module 1 can then readily be mounted above such document scanner means.

Figure 2:
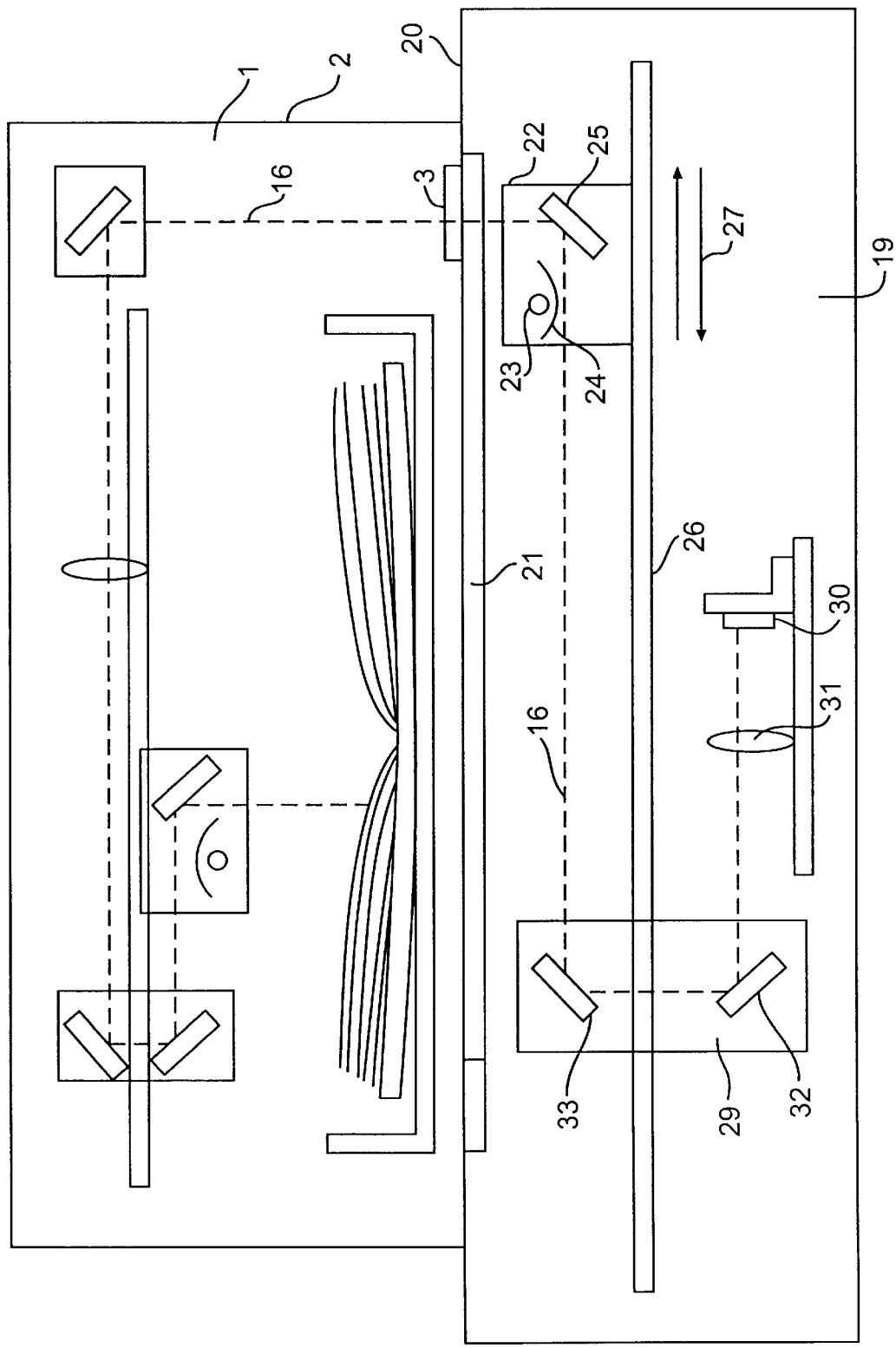
FIG. 2 shows a first combination of the scan module of FIG. 1 in a document scanner means of the reduction type.

FIG. 2 shows how the scan module 1 of FIG. 1 can be combined with document scanner means 19 of a document copying machine not shown in detail in the drawing. The scan module 1 of FIG. 1 is in this case preferably releasably mounted via the housing 2 on the top 20 of the document scanner means 19. The latter comprise a transparent window or image platen 21 where, in a first operating mode without the presence of the scan module 1, original sheets are placed with the information page face down for scanning. In a second mode, in the presence of the scan module 1, a scan carriage 22 with lamp 23, shielding cap 24 and a reflector 25 is fixedly positioned at a position opposite the light exit opening 3 of the scan module 1. In this case the scan carriage 22 is movable in the indicated directions 27 with the aid of the guide means 26. The linear reflector 25 deflects the light of the strip of document 5 scanned by the scan module 1 to a photoelectric converter 30 by means of a mirror carriage 29 movable in the directions 27. The photoelectric converter 30 is in the form of a linear CCD array with the longitudinal direction such that the scanned strip of the document 5 is imaged thereon via the lens means 31. Of course in the second mode the mirror carriage 29 is also placed in a fixed position. The scan carriage 22 also comprises reflectors 32 and 33 for deflection of the light from the scan carriage 22 to the photoelectric converter 30.

The document scanner means 19 require no expensive structural modifications to make them suitable for co-operation with the scan module 1 in the manner described. The most that is required is to define in the document copying machine control system a mode in which the scan carriage 22 and the mirror carriage 29 occupy the required necessary positions and the lamp 23 is switched off. The electrical image signals produced by the photoelectric converter 30 are suitable to activate printing means, such as a laser or LED exposure, in combination with a photoconductive medium, to produce a toner image on a copy sheet.

Preferably, the magnification factor formed by the optical system of the scan module is unity. The magnification factor of the document scanner means 19 does not then require adaptation.

Furthermore, the image plane formed by the optical system of the scan module 1 preferably coincides approximately with the plane of the window 21. In this way, the material present in this plane will have minimum influence on the image formation.

The document scanner means 19 described are of the reduction type, in which imaging via the lens means 31 is imaged in a reduced scale on the photoelectric converter 30.

Figure 3:
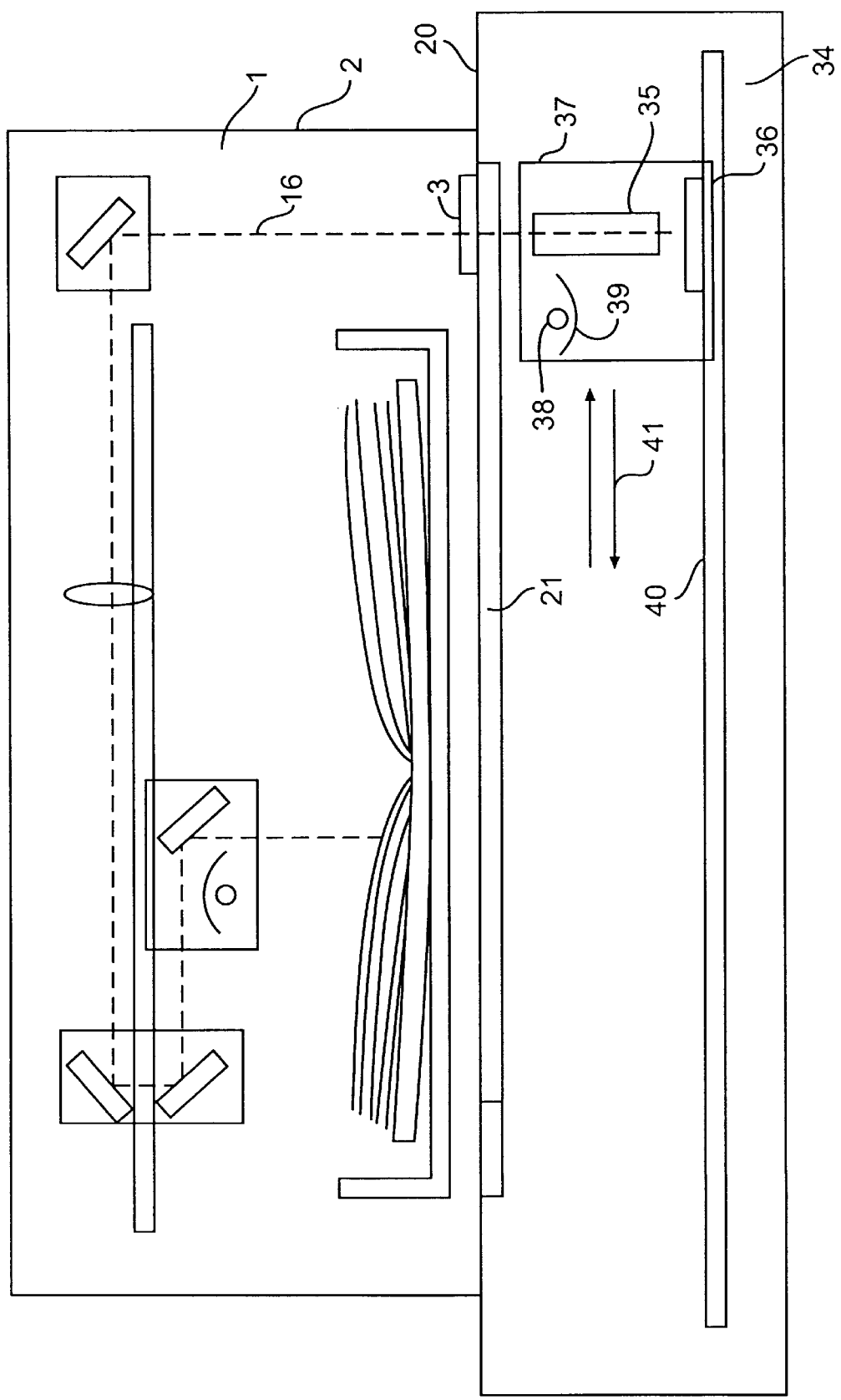
FIG. 3 shows a second combination of the scan module of FIG. 1 with document scanner means of the contact type.

FIG. 3 shows the scan module 1 of FIG. 1 in combination with document scanner means 34 of the contact type. In this case, a 1-to-1 image of the object plane coinciding with the window 21 is made by means of a selfoc lens array 35 on a photoelectric converter 36 of the contact type. The scan carriage 37 is also provided with a lamp 38 and a shielding cap 39. In a first mode without a scan module 1 fitted therein, the scan carriage 37 is also movable via the guide means 40 in the directions 41. In a second mode with the scan module 1 mounted therein, the scan carriage 37 is positioned at a fixed position opposite the light exit opening 3 of the scan module 1.

To ensure that as much light as possible reflected from the scanned original 5 falls on the final photoelectric converter 30/36, a number of extra steps can be taken.

Figure 4:
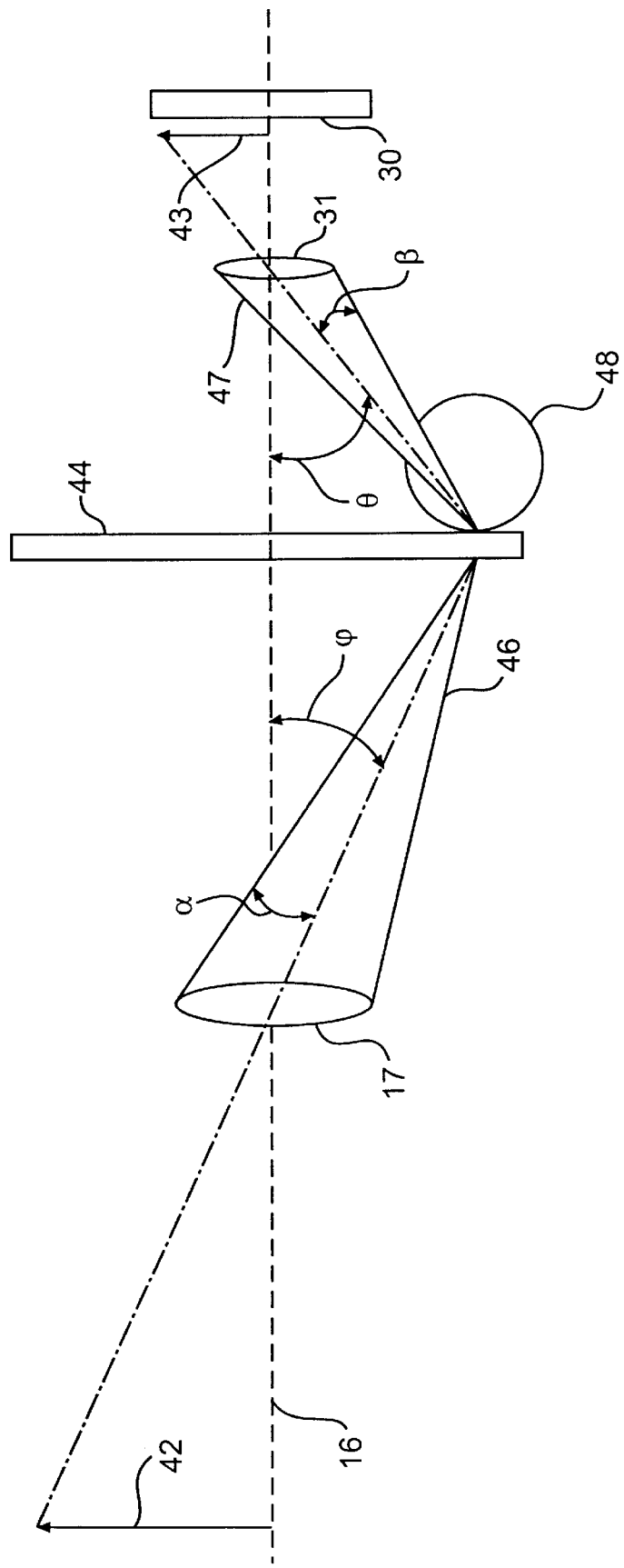
FIG. 4 diagrammatically shows the coupling by means of a diffuser between the optical system of the scan module and the document scanner means of the reduction type.

FIG. 4 shows a step of this kind in order to increase the efficiency of the light transfer from the scan module 1 to the document scanner means 19 of the reduction type. Here reference 42 symbolically denotes the object for imaging, corresponding to a strip of the document 5 for scanning. Reference 43 diagrammatically illustrates the final image on the photoelectric converter 30. Also shown are the lens 17 of the scan module 1, a diffuser 44 and the lens 31 of the document scanner means 19. The function of the diffuser 44 is to scatter the light incident thereon and reflected from the document 5, in the direction of the opening of the lens 1 in order to increase the efficiency of the light transfer. The diffuser 44 is positioned in the plane of the light exit opening 3 of the scan module 1. The lenses 17 and 31 are also so positioned that the image plane of the lens 17 coincides with the object plane of the lens 31 and both planes are situated substantially in the plane of the light exit opening 3. In a first embodiment the diffuser 44 is constructed as a flat plate which scatters over a large angle light incident thereon.

FIG. 4 diagrammatically indicates with the cone shape 46 having angles $\phi$ and $\alpha$, the maximum angle at which light still reflected from the document 5 is incident on the diffuser 44. The cone shape 47 with the angles $\theta$ and $\beta$ shows the maximum angle at which the document scanner means 19 comprising the lens 31 can still receive light scattered by the diffuser 44. In the case of a diffuser 44 scattering the incident light in every direction to a Lambert's distribution 48 at least some of the light is still received, i.e. that part of the distribution 48 that coincides with the cone shape 47. It should be noted that in the absence of the diffuser 44 light will admittedly still be received by the document scanner means 19, although this light will include a small angle with the optical axis 16. Only a small part of the document 5 is imaged as a result. Despite some absorption of light, the diffuser 44 gives a greater light yield by guiding to the document scanner means 19 even light including a larger angle with the optical axis 16. A greater part of the document 5 is now imaged with the diffuser 44. A polycarbonate diffuser, for example, passes 20% to 50% incident light and scatters it to a Lambert's distribution. The efficiency of the total light transfer that can be achieved with a diffuser of this kind is approximately 2%.

A holographic diffuser, e.g. a light shape diffuser supplied by Physical Optics Corporation, has a more directional distribution. This can, for example, be a 1°×40° elliptical distribution. With this the light transfer can be increased by about 60%. The transmission is more than 85%, the scattered light distribution having more of a flat distribution in the main direction. Taking into account the extra losses due to the reflectors and glass-air transitions, the increase in light transfer is about 40%. If the lens 17 has a focal length f of 270 mm and an aperture or f-number f# of 5.0, approximately 0.15% of the light reflected by the document 5 reaches the diffuser 44. The total efficiency of a scan module 1 of this kind is then approximately 0.06%. For comparison, the document scanner means 19 have an efficiency of 1.3%. In this case the lens 31 of the document scanner means 19 has a focal length of 50 mm and an aperture or f-number f# of 3.2.

The optical magnification factor M of the scan module is preferably 1 since there is then no need to adapt existing document scanner means.

Figure 5:
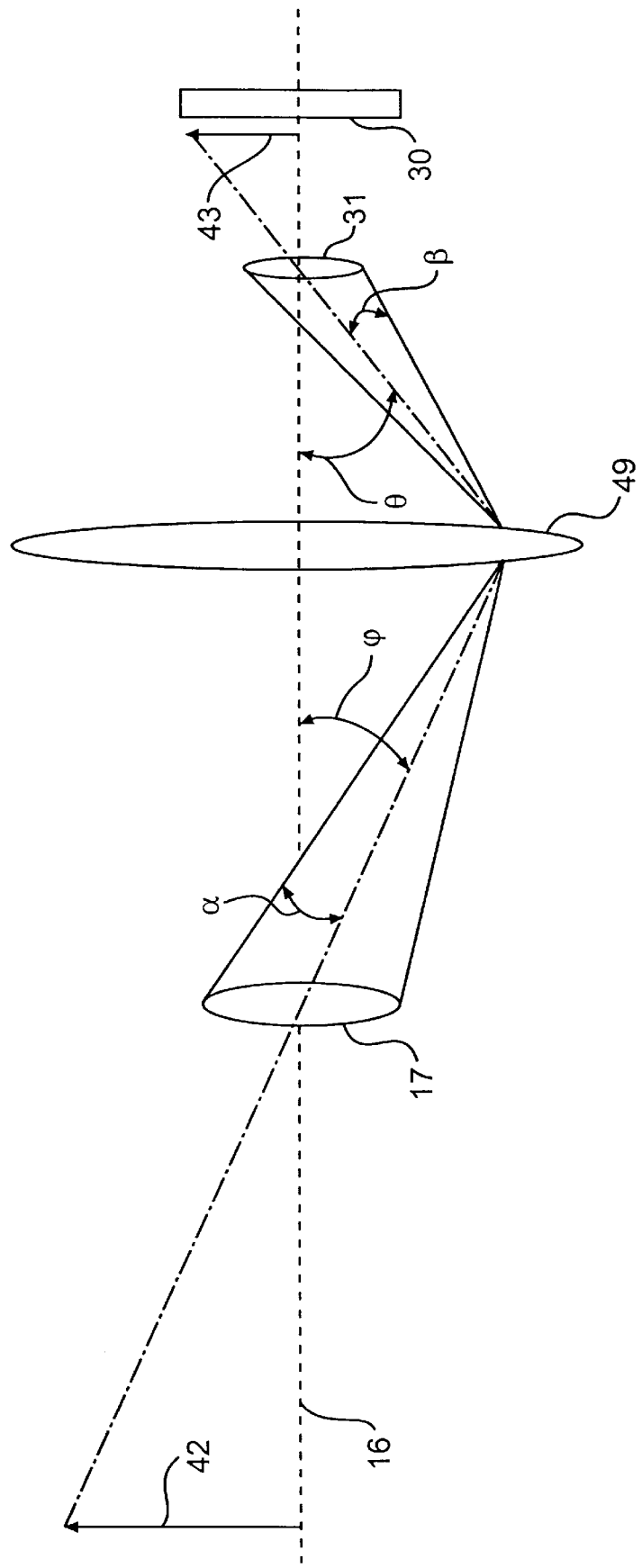
FIG. 5 diagrammatically illustrates the coupling by means of a collimating lens between the optical system of the scan module and the document scanner means of the reduction type.

FIG. 5 shows an embodiment using a collimating lens 49 instead of the diffuser 44. The lens 49 is cylindrical and has the width of the document 5 for scanning. Although the losses due to scatter and absorption are less than in the case of a diffuser, the collimated light still has to be received by the document scanner means 19. Depending on the properties of the optical system of the scan module 1 and the document scanner means 19, the efficiency can be greater but also less with respect to an embodiment using a diffuser.

Figure 6:
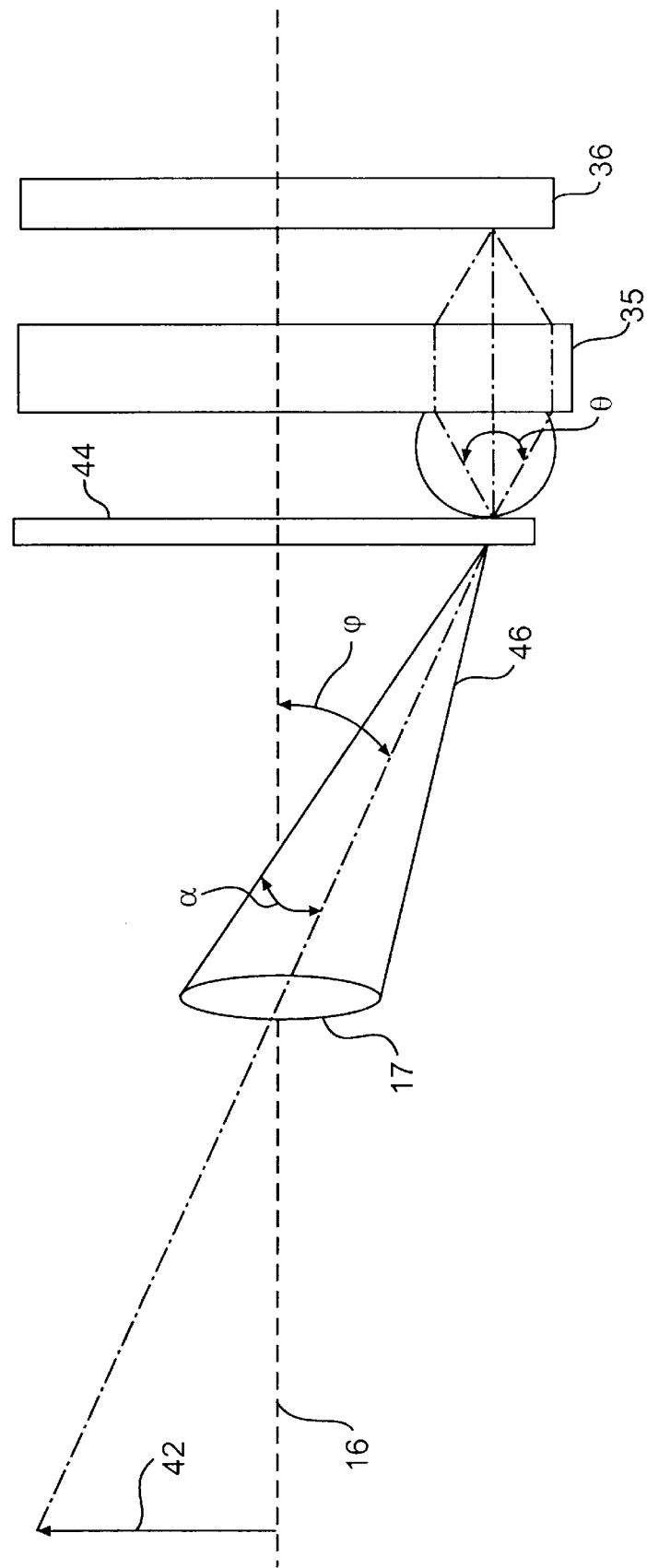
FIG. 6 diagrammatically illustrates the coupling by means of a diffuser between the optical system of the scan module and the document scanner means of the contact type.

FIG. 6 shows an embodiment with document scanner means 34 of the contact type. Here the selfoc lens array 35 is used in combination with photoelectric converters 36 of the contact type. Document scanner means 34 of this kind are much more efficient because the aperture of these lenses is much larger than that of conventional lenses. Characteristic values for the aperture f# are 2.7 and 1.8. Here $\theta$ is the maximum receiving angle over which the SLA array can still receive light. In one embodiment an efficiency of 0.04% is possible in this way.

The curvature of the pages of an opened bound document results in a distortion and defocusing in the scanned image. The distortion is due to the fact that The angle at which the document 5 is perceived changes particularly with the spine of the document 5. By adapting the speed of the scan carriage 6, a correction can be provided for this distortion.

Defocusing occurs because the distance between the document 5 and the reflector 9 varies. This can be corrected by adjusting the position of the mirror carriage 14.

These corrections can be made only if the distance to the document 5 and the angle that the document 5 includes with the optical axis 16 are known. Various embodiments are possible in this connection. Distance measurement can be effected both ultrasonically and optically. Auto-focus means can also be used.

Figure 7:
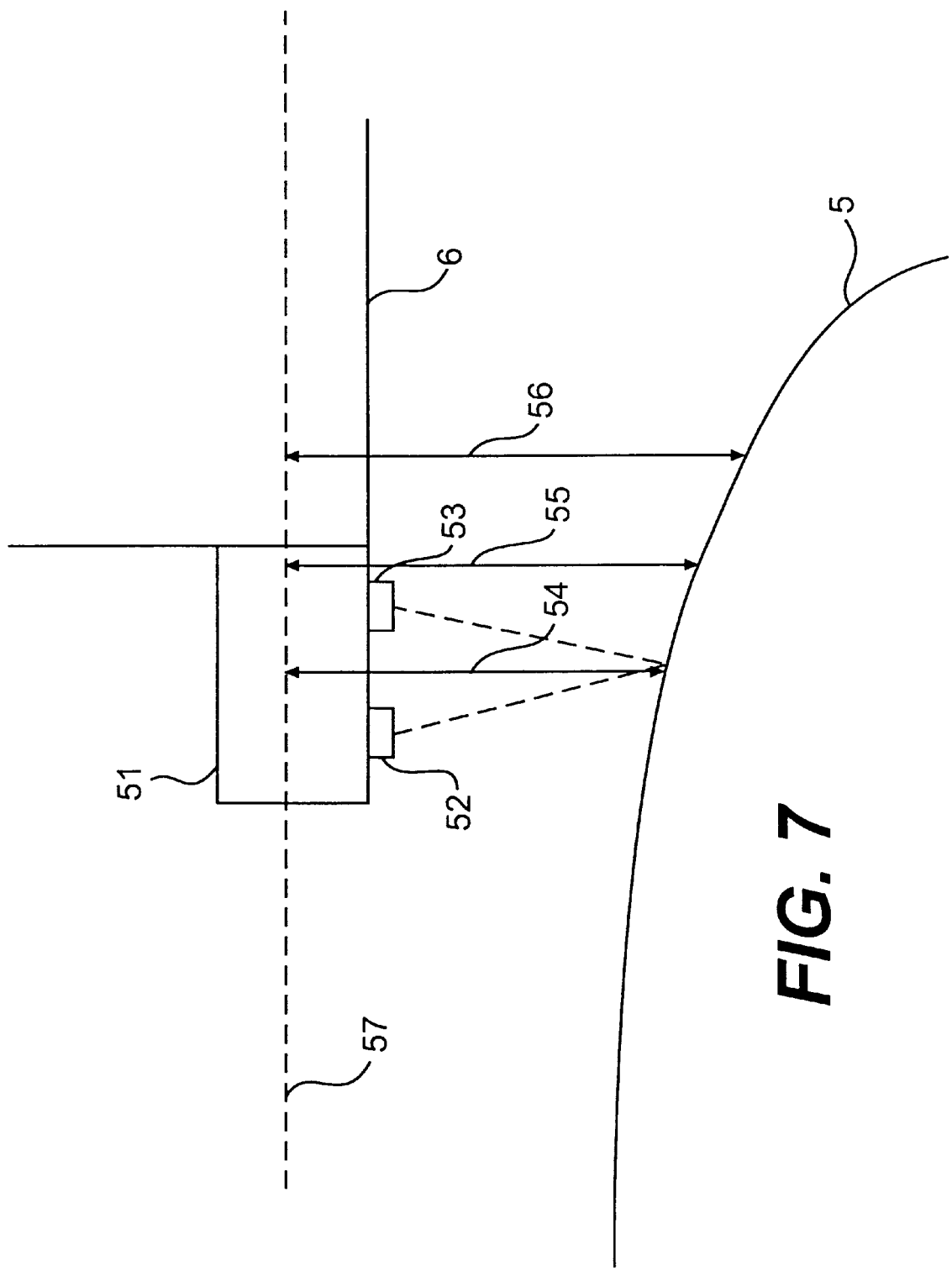
FIG. 7 is a diagram showing a construction for measuring the distance between an original sheet and the scanner means.

FIG. 7 diagrammatically shows how the scan carriage 6 can be provided with distance measurement means 51. For this purpose, the means 51 comprise a light-emitting transmitter 52 and a light-sensitive receiver 53. By measuring the distances 54, 55 and 56 at regular positions of the scan carriage 6 it is also possible to determine the angle that the document 5 includes with the direction of movement 57 of the scan carriage 6. In this way it is possible to provide a correction for the distortion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A scan module for a document copying machine having document scanner means and an image platen, the scan module comprising:

a housing releasably fixing the scan module to the document copying machine;

a light exit opening in the housing optically coupled to a document scanner means;

a light source for exposing a document; and reflector means for deflecting light reflected by a document to the light exit opening via an optical path, wherein said light enters the copying machine via said image platen.

2. The scan module according to claim 1, further comprising lens means in the optical path, an image plane of the lens means being situated at a location of a document application plane of the document copying machine.

3. The scan module according to claim 2, further comprising light deflection means in the optical path at the light exit opening for deflecting light emerging from the light exit opening to a light entry opening of the document scanner means of the document copying machine.

4. The scan module according to claim 3, wherein the light deflecting means comprise a collimating lens.

5. The scan module according to claim 3, wherein the light deflecting means comprise a diffuser.

6. The scan module according to claim 5, wherein the diffuser is direction-sensitive.

7. The scan module according to claim 2, wherein an optical magnification factor formed by the lens means is equal or substantially equal to unity.

8. The scan module according to claim 7, further comprising light deflection means in the optical path at the light exit opening for deflecting light emerging from the light exit opening to a light entry opening of the document scanner means of the document copying machine.

9. The scan module according to claim 1, further comprising a document drawer which is slidable between a first position and a second position, a document being insertable into the drawer or being turned in the drawer when the drawer is in the first position, the document being positionable with an information page thereof face up when in the drawer, the document being situated with the information page face up and being scannable by the scanner means of the document copying machine when the drawer with the document is in the second position.

10. The scan module according to claim 1, further comprising:

a movable scan carriage with first reflector means for deflecting reflected light originating from the document;

drive means for moving the scanner carriage with respect to the document;

movable second reflector means situated in the optical path; and means for coupling the second reflector means with the scanner carriage for moving the second reflector means in synchronism therewith in order to obtain a constant length of the optical path between the document and the light exit opening.

11. The scan module according to claim 10, further comprising:

distance determining means for determining the distance of the document from the scan carriage over an entire dimension of the document and obtaining distance signals corresponding thereto; and control means for correcting movement of the second reflector means on the basis of the distance signals fed thereto, in order to attain a constant length of the optical path between the document and the light exit opening.

12. The scan module according to claim 11, further comprising control means for correcting speed of movement of the second reflector means based on the distance signals fed thereto.

13. A system comprising a document copying machine and a scan module, the document copying machine having document scanner means and an image platen, the scan module comprising:

a housing releasably fixing the scan module to the document copying machine;

a light exit opening in the housing optically coupled to the document scanner means of the document copying machine;

a light source for exposing a document to be fed to the scan module; and reflector means for deflecting light reflected by a document to the light exit opening via an optical path, wherein said light enters the copying machine via said image platen.

14. The system according to claim 13, wherein at least part of the document scanner means of the document copying machine is movable with respect to a document to be scanned thereby, wherein:

in a first mode in which the scan module is off of the document copying machine, the at least one part of the document scanner means moves with respect to a document present on the document copying machine; and in a second mode in which the scan module is mounted on the document copying machine and the scan module is operative, the at least one part of the document scanner means is in a fixed position with respect to the light exit opening of the scan module.

15. The system according to claim 13, wherein the document copying machine is provided with means for automatically supplying documents for moving the documents along the document scanner means of the document copying machine, said document scanner means being disposed in a fixed position, and the light exit opening of the scan module being situated opposite said fixed position.

16. The system according to claim 13, wherein the scan module further comprises lens means in the optical path, an image plane of the lens means being situated at a location of a document application plane of the document copying machine.

17. The system according to claim 16, wherein the scan module further comprises light deflection means in the optical path at the light exit opening for deflecting light emerging from the light exit opening to a light entry opening of the document scanner means of the document copying machine.

18. The system according to claim 17, wherein the light deflecting means comprise a collimating lens.

19. The system according to claim 17, wherein the light deflecting means comprise a diffuser.

20. The system according to claim 19, wherein the diffuser is direction-sensitive.

21. The system according to claim 16, wherein the scan module includes an optical magnification factor formed by the lens means which is equal or substantially equal to unity.

22. The system according to claim 21, wherein the scan module further comprises light deflection means in the optical path at the light exit opening for deflecting light emerging from the light exit opening to a light entry opening of the document scanner means of the document copying machine.

23. The system according to claim 13, wherein the scan module further comprises a document drawer which is slidable between a first position and a second position, a document being insertable into the drawer or being turned in the drawer when the drawer is in the first position, the document being positionable with an information page thereof face up when in the drawer, the document being situated with the information page face up and being scannable by the scanner means of the document copying machine when the drawer with the document is in the second position.

24. The system according to claim 13, wherein the scan module further comprises:

a movable scan carriage with first reflector means for deflecting reflected light originating from the document;

drive means for moving the scanner carriage with respect to the document;

movable second reflector means situated in the optical path; and means for coupling the second reflector means with the scanner carriage for moving the second reflector means in synchronism therewith in order to obtain a constant length of the optical path between the document and the light exit opening.

25. The system according to claim 24, wherein the scan module further comprises:

distance determining means for determining the distance of the document from the scan carriage over an entire dimension of the document and obtaining distance signals corresponding thereto; and control means for correcting movement of the second reflector means on the basis of the distance signals fed thereto, in order to attain a constant length of the optical path between the document and the light exit opening.

26. The system according to claim 25, wherein the scan module further comprises control means for correcting speed of movement of the second reflector means based on the distance signals fed thereto.

27. The scan module according to claim 1, further comprising a document drawer, a document being insertable into the drawer and being scannable by the scanner means.

28. The system according to claim 13, further comprising a document drawer, a document being insertable into the drawer and being scannable by the scanner means.

* * * * *